United States Patent
Bernasconi et al.

(10) Patent No.: US 7,218,577 B2
(45) Date of Patent: May 15, 2007

(54) METHOD FOR SYNCHRONISING AN ANALOG DISPLAY OF A TIMEPIECE WITH ITS ELECTRONIC TIME BASE

(75) Inventors: Ermanno Bernasconi, Neuchâtel (CH); Roger Buehler, Le Locle (CH); Rudolf Dinger, Saint-Aubin (CH); Pierre-André Farine, Neuchâtel (CH)

(73) Assignee: Asulab, S.A., Marin (CH)

(*) Notice: Subject to any disclaimer, the term of this patent is extended or adjusted under 35 U.S.C. 154(b) by 0 days.

(21) Appl. No.: 11/151,303

(22) Filed: Jun. 14, 2005

(65) Prior Publication Data

US 2005/0276166 A1    Dec. 15, 2005

(30) Foreign Application Priority Data

Jun. 15, 2004    (EP) .................. 04013926

(51) Int. Cl.
G04B 19/00    (2006.01)
G04B 19/04    (2006.01)

(52) U.S. Cl. .............. 368/80; 368/76; 368/47

(58) Field of Classification Search ........... 368/10, 368/47, 185–187, 72–74, 76, 80, 181, 272, 368/273
See application file for complete search history.

(56) References Cited

U.S. PATENT DOCUMENTS

| | | |
|---|---|---|
| 3,815,351 A | 6/1974 | Vovelle |
| 5,245,591 A | 9/1993 | Katou |
| 5,270,993 A | 12/1993 | Besson et al. |
| 5,898,644 A | 4/1999 | Ganter et al. |
| 6,038,523 A | 3/2000 | Akahane et al. |
| 6,330,207 B1 | 12/2001 | Born et al. |
| 6,454,458 B1 | 9/2002 | Born et al. |

FOREIGN PATENT DOCUMENTS

| | | |
|---|---|---|
| DE | 34 19 499 A1 | 11/1985 |
| DE | 38 28 810 A1 | 3/1990 |
| EP | 746 100 A1 | 12/1996 |
| EP | 841 538 A1 | 5/1998 |
| EP | 952 426 A1 | 10/1999 |
| EP | 969 266 A1 | 1/2000 |
| EP | 1 256 855 A2 | 11/2002 |
| EP | 1 422 581 A2 | 5/2004 |
| FR | 2 379 106 | 8/1978 |

*Primary Examiner*—Vit Miska
*Assistant Examiner*—Thanh S. Phan
(74) *Attorney, Agent, or Firm*—Sughrue Mion, PLLC

(57) ABSTRACT

The method of synchronizing the analogue display (41) of a timepiece (40), including an electronic time base (64), is achieved using proximity sensors (60, 62) respectively associated with wheels (46, 48) each having an aperture (54, 56) for defining the angular position of the latter. Determination of the angular position of a wheel requires an angular distance of around 60° to 90° to be travelled with this type of proximity sensor. Dependency of the measurement results upon the temperature generates a problem of precision in determining the angular position of the wheels, in particular a wheel secured to the hour indicator, given that an angle of 60° to 90° corresponds to a time interval of 2 to 3 hours. In order to ensure a measurement in a relatively short time interval where the ambient temperature is substantially constant and thus has no influence on the measurement, the invention provides that, in a analogue display synchronization mode at least one indicator is driven in an accelerated advance mode so that the aperture provided in the corresponding wheel quickly passes opposite the proximity sensor associated with that wheel.

6 Claims, 3 Drawing Sheets

METHOD FOR SYNCHRONISING AN ANALOG DISPLAY OF A TIMEPIECE WITH ITS ELECTRONIC TIME BASE

This application claims priority from European Patent Application No. 04013926.3 filed Jun. 15, 2004, the entire disclosure of which is incorporated herein by reference.

BACKGROUND OF THE INVENTION

The present invention concerns a method of synchronising the analogue display of a timepiece whose movement is fitted with an electronic time base. This time base is fitted with a quartz oscillator well known to those skilled in the art. The analogue display includes an analogue indicator coupled in rotation to a first watch movement wheel. Within the scope of the present invention, this first wheel is associated with a proximity sensor and has at least one aperture in its plate that is preferably made of an electrically conductive material. The proximity sensor is arranged for detecting the aperture of the first wheel and more specifically for determining the position of a reference geometrical semi-axis defined by said aperture.

In particular, the analogue indicator is a time indicator.

The principle of detection of the semi-axis defined by an aperture provided in the wheel coupled to an analogue indicator is disclosed in particular in EP Patent No. 0 952 426 (corresponding to U.S. Pat. No. 6,330,207). The arrangement of the proximity sensor relative to the wheel that is associated therewith and the operation thereof will be briefly described hereinafter with reference to FIGS. 1 to 3.

Watch movement 2 comprises a toothed wheel 4 with a toothing 6 defined on the outer edge of plate 8 of said wheel. Wheel 4 further comprises an arbour 10 defining a geometrical axis of rotation 12. Watch movement 2 is associated with an analogue display comprising a rotating indicator 14, in particular a hand, fixedly mounted on arbour 10. Indicator 14 can be used to indicate the hour, minute or any other useful information required. Within the scope of the present invention, indicator 14 belongs to an analogue display of the current time, the object being to synchronise this indicator with an electronic time base of the watch movement. Indicator is secured to plate 8 in rotation.

Plate 8 has a circular aperture 16. It will be noted that the contour of this aperture can be different, particularly rectangular. An inductive sensor 20, formed of an integrated circuit 22 and a flat spiral coil 24 arranged on one face of the integrated circuit, is arranged relative to plate 8 such that flat coil 24 is at least partially below aperture 16 in at least one given angular position of wheel 4. It will be noted that the coil can be connected to the electronic circuit without being arranged thereon.

Preferably, as shown in FIG. 1, central magnetic axis 26 of the spiral forming flat coil 24 passes substantially through the geometrical centre 28 of aperture 16 in a given angular position of wheel 4. Aperture 16 defines a reference geometrical semi-axis REF of wheel 4. This semi-axis starts from geometrical axis 12 and passes through the centre 28 of circular aperture 16. Inductive sensor 20, which forms a proximity sensor, is arranged for determining the position of reference semi-axis REF.

Sensor 20 includes for example an electronic circuit of the type described in EP Patent No. 0 746 100 (corresponding to U.S. Pat. No. 4,240,528) with a differential relaxation oscillator. This type of sensor provides an alternating signal whose frequency varies as a function of the proximity of electrically conductive materials relative to the detection coil. Aperture 16 generates a variation in material in proximity to coil 24 when wheel 4 rotates. In certain cases, a sensor having a different electronic architecture based on a harmonic oscillator can be provided.

As shown schematically in FIG. 3, sensor 20 provides a measurement signal whose points of measurement 32 obtained as a function of the angular position α of reference semi-axis REF define a graph 30 that is substantially symmetrical in relation to a geometrical axis 34. The angular position of this axis 34 corresponds to an angle $\alpha_{REF}$ of wheel 4 when its reference semi-axis REF intersects central magnetic axis 26 of flat coil 24. Enough measurements will be taken to obtain a density of points of measurement 32 allowing the negative slope and the positive slope of graph 30 to be differentiated, so that the position of the axis of symmetry 34 of graph 30 can be determined.

After having carried out the measurements necessary to determine the evolution of the sensor measurement signal when the aperture passes above the sensor coil, electronic means for processing the measurement results determine angle $\alpha_{REF}$ and thus the corresponding position of hand 14.

It will be noted that the dimensions of coil 24 are preferably of the order of 1 mm$^2$. When the diameter of the wheel with the aperture for detecting its position is relatively small, the aperture then preferably has a surface area defining an annular sector whose radial dimension is less than the tangential dimension, the radial dimension being then less than the corresponding dimension of the detection coil. In this latter case, the measurements for setting up graph 30 and determining the position of axis of symmetry 34 require wheel 4 to travel an angular distance of approximately 90°. In the most favourable case shown in FIGS. 1 and 3, the angular distance necessary is already of the order of 60°. These values are minimum values corresponding to the case in which the position of indicator 14 substantially corresponds to the theoretical position given by the electronic time base of the watch movement. If the position of the indicator associated with the detection wheel is located, particularly due to shocks received by the timepiece, in a relatively far position from the aforementioned theoretical position, the angular distance necessary for detection of reference semi-axis REF of the wheel will be greater than the values given hereinbefore.

SUMMARY OF THE INVENTION

These considerations are important within the scope of the present invention where inventors have shed light on a problem of precision in the determination of reference angle $\alpha_{REF}$ i.e. the angular position of reference semi-axis, and particularly for the hour indicator when synchronisation between the analogue display and the current time given by the electronic time base is achieved in accordance with the synchronisation mode proposed in EP Patent No. 0 952 426. In order to check the position of semi-axis $\alpha_{REF}$, i.e. in order to synchronise the analogue display with the electronic time base of the watch movement, this patent proposes waiting for the passage of the wheel aperture in question into the region of the sensor, more specifically waiting for the semi-axis REF defined by the aperture to sweep the detection coil of the proximity sensor. Inventors have shed light on inaccuracies in determining the reference angular position $\alpha_{REF}$ which arise from a variation in the frequency measured by the sensor as a function of the ambient temperature. As shown in FIG. 4, a decrease can be observed in the measuring frequency F of the inductive sensor with a temperature increase. The decrease observed is of the order of 20 kHz per ° C. The figures mentioned in the axes of FIG. 4 are given by way of non-limiting example. For a wheel driven by an horological stepping motor, a maximum measurement signal frequency variation of around 80 kHz for one step of the motor has been observed. Thus, a temperature variation of around 4° C. corresponds in all cases to a similar frequency variation to that corresponding to one step of the motor when the wheel aperture passes opposite the inductive sensor. The consequence of this is to introduce a measurement error when the temperature varies. As soon as the temperature varies by 2° C. or more, an error as to the determination of the exact position of the indicator is generated by this temperature variation. It will be noted that the hour indicator travels an angular distance of 60° in two hours and an angular distance of 90° in three hours. Over quite a long period, a timepiece temperature variation can greatly exceed 2° C. such that determination of the reference angle $\alpha_{REF}$ is distorted.

After having shed light on the aforementioned problem and explained the reasons causing such problem, it is an object of the present invention to provide a solution for solving the latter.

The present invention therefore concerns a method for synchronising the analogue display of the current time of a timepiece, fitted with a movement having an electronic time base, with said time base, the analogue display including at least one analogue indicator which is coupled in rotation with a wheel having at least one aperture, the wheel being associated with a proximity sensor arranged for detecting said aperture and for determining the position of a reference semi-axis defined by said aperture, the synchronisation method being characterised by the following steps:

driving said analogue indicator in an accelerate advance mode until said aperture of said wheel passes opposite said proximity sensor;

determining the real angular position of said reference semi-axis by electronic means receiving a measurement signal supplied by said proximity sensor;

calculating, for said analogue display of said timepiece, the theoretical angular position of said reference semi-axis as a function of a reference current time given by said electronic time base;

driving said analogue indicator until the real angular position of said reference semi-axis corresponds to said theoretic angular position.

As a result of the steps of the synchronisation method described hereinbefore, in particular driving the analogue indicator in an accelerated advance mode, the position of the reference semi-axis of the detection wheel is precisely determined, given that the accelerated advance considerably reduces the passage time of the wheel aperture above the detection coil of the sensor. The succession of frequency measurements by the sensor is thus accelerated and the entire set of necessary measurements can be carried out in a time interval of less than five seconds. In such a situation, the temperature is generally stable and its influence becomes totally negligible.

BRIEF DESCRIPTION OF THE DRAWINGS

The drawing annexed to the present description of the invention includes.

DETAILED DESCRIPTION OF THE INVENTION

Figure 1:
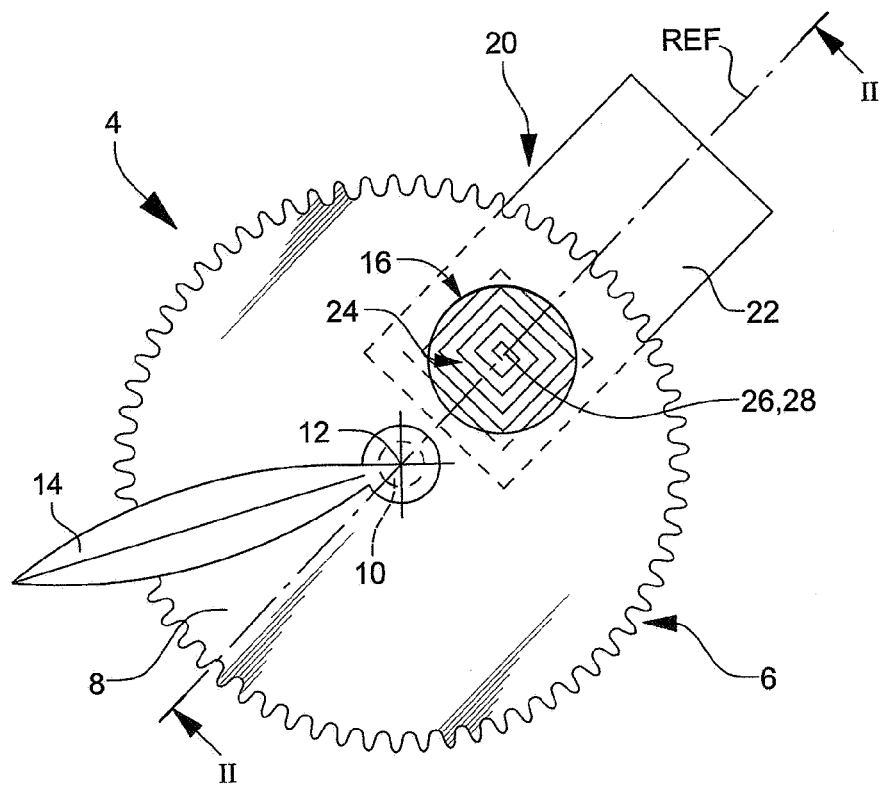
FIG. 1, already described, schematically showing the arrangement provided for determining the angular position of an indicator.

Timepiece 40 comprises an analogue display 41 of the current time. This display includes an hour indicator 42 and a minute indicator 44. Indicators 42 and 44, formed in particular by conventional hands, are coupled in rotation respectively to a first wheel 46 and to a second wheel 48. Two stepping motors 50 and 52 respectively drive these wheels 46 and 48. As previously described with reference to FIG. 1, wheels 46 and 48 have an aperture, respectively 54 and 56 in their plate formed by an electrically conductive material. An inductive proximity sensor respectively 60 and 62 is associated with each of these first and second wheels, for detecting the aperture respectively 54 and 56 so as to determine precisely the angular position of each of the two indicators 42 and 44.

Figure 2:
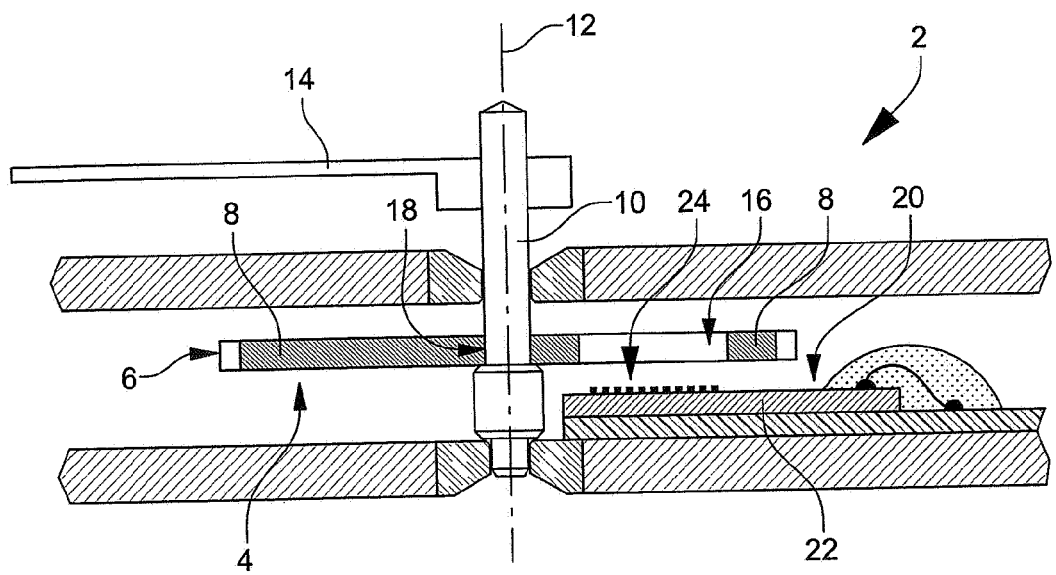
FIG. 2, already described, corresponding to a cross-section along the line II—II of FIG. 1.
Figure 3:
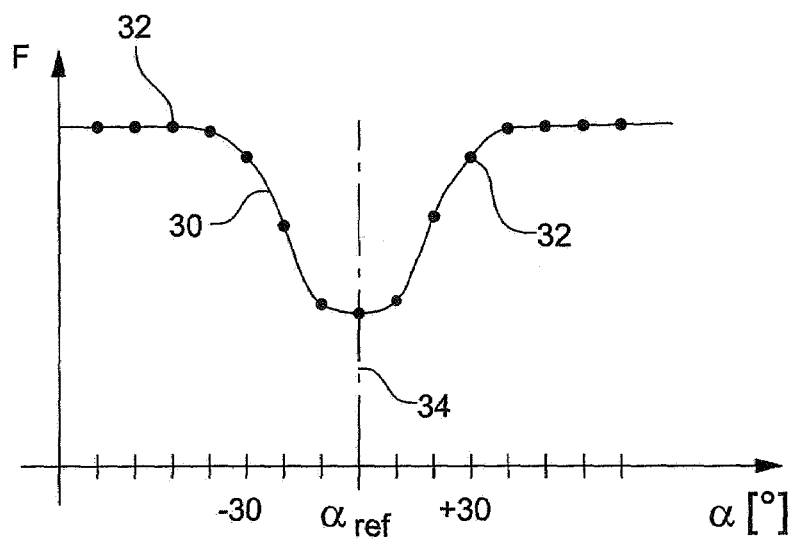
FIG. 3 schematically showing the frequency variation of the measurement signal provided by a proximity sensor as a function of a variation in matter above the sensor.
Figure 4:
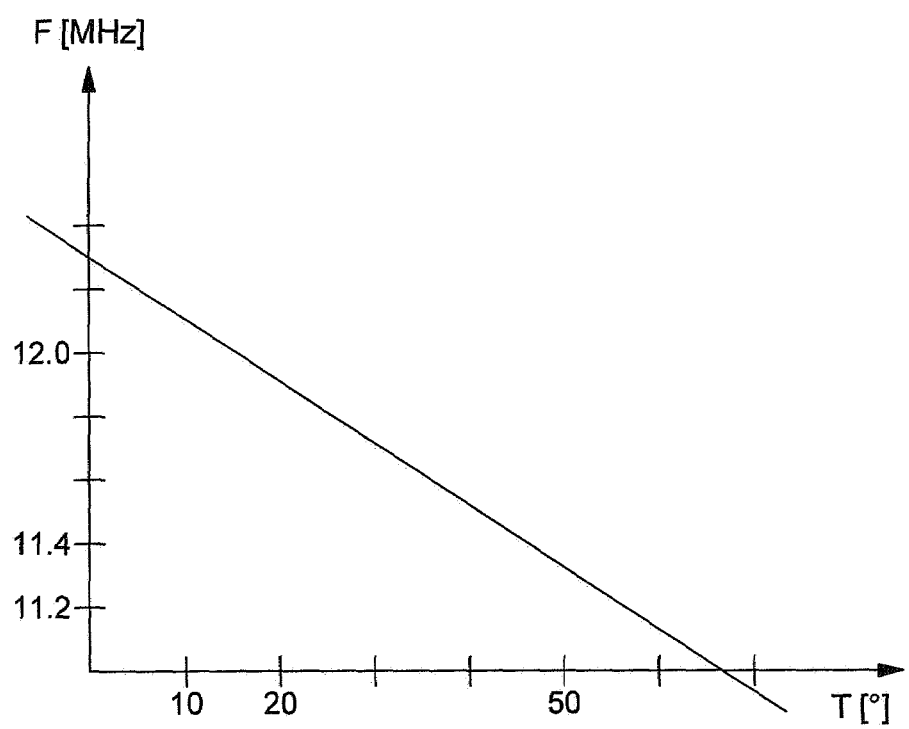
FIG. 4, already described, showing a graph of the frequency variation in the measurement signal provided by a proximity sensor, for a given angular position of the aperture provided in a detection wheel, as a function of the measurement temperature, and FIG. 5 schematically showing a timepiece in which the synchronisation method according to the invention is implemented.
Figure 5:
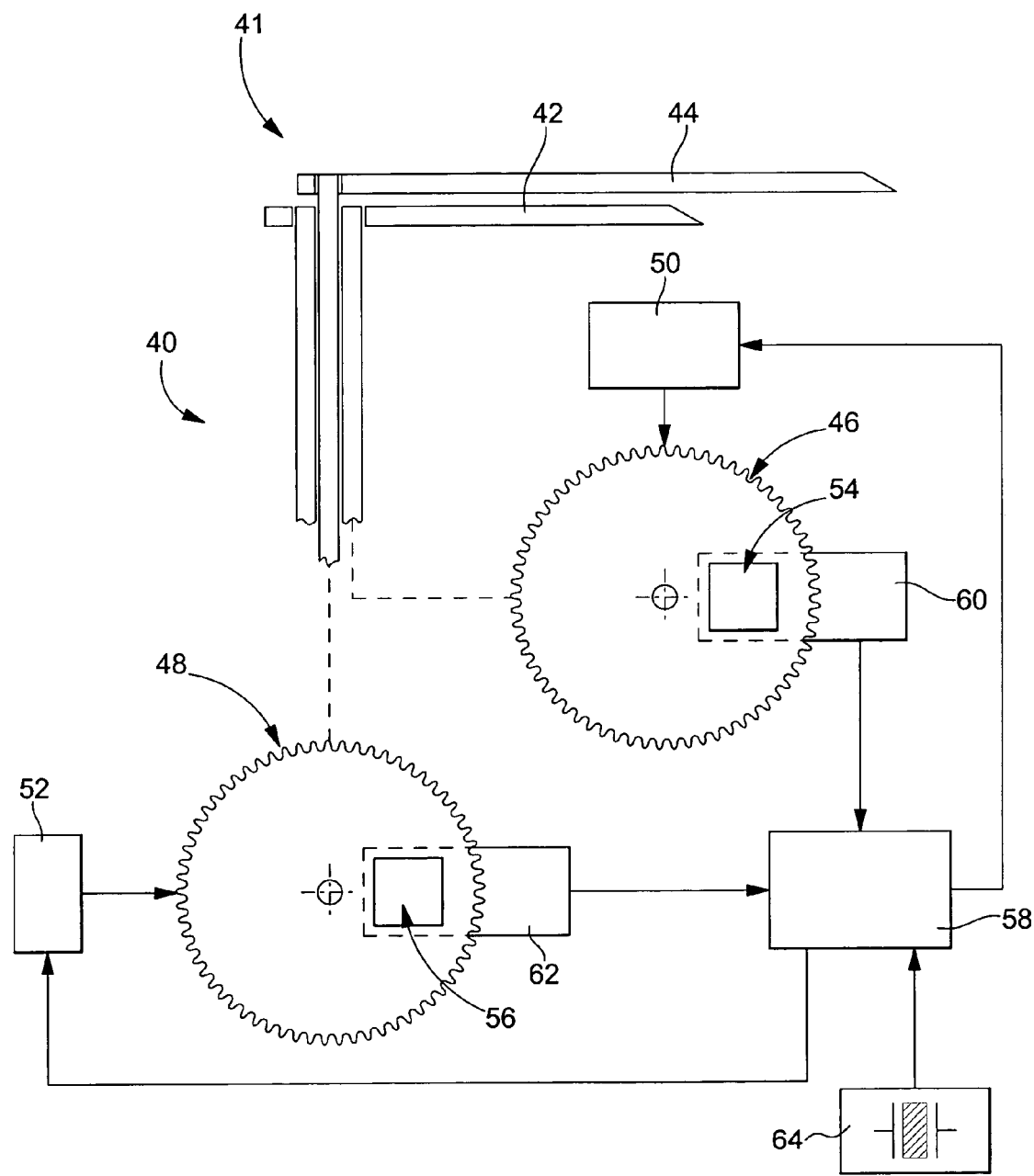
With reference to FIG. 5, a timepiece 40 for implementing the synchronisation method according to the invention will be described schematically hereinafter.

The method of detecting the angular position of a wheel, in particular its reference semi-axis $\alpha_{REF}$ as described previously with reference to FIGS. 1 to 3 will not be described again here. Sensors 60 and 62 are shown entirely schematically, without the detection coil. Timepiece 40 includes an electronic circuit 58 arranged for receiving the measurement signals from sensors 60 and 62, for processing the measurement signals so as to determine the angular position of the reference semi-axis of each of the two wheels 46 and 48. Finally, timepiece 40 includes an electronic time base 64 provided, in a conventional manner, with a quartz oscillator. Time base 64 provides electronic circuit 58 with the reference current time, this reference current time defining a theoretical current time for synchronising hands 42 and 44 of analogue display 41.

Circuit 58 also includes counter means for counting the number of steps made by each of the two motors 50 and 52. Thus, in the mode synchronising analogue display 41 with the reference current time given by time base 64, electronic circuit 58 stores the evolution of the angular distance travelled by the wheel, of which the angular position of the reference semi-axis passing through the centre of its aperture is required to be determined, in order to know the angular position of the reference semi-axis once the reference angle $\alpha_{REF}$ has been determined by circuit 58.

According to the invention, when the synchronisation mode is on, manually or automatically at a given daily or weekly time, wheel 46 mechanically coupled to hour indicator 42 is driven by motor 50 in an accelerated manner relative to the normal angular speed of wheel 46. As already mentioned, this efficiently solves the problem of disrupting the precise detection of the reference semi-axis, such disruption being generated when there is a temperature variation.

When the synchronisation mode is on, the hour indicator synchronisation method includes the following steps:
- driving hour indicator 42 in an accelerated advance mode until aperture 54 of wheel 46 passes opposite proximity sensor 60 associated with wheel 46,
- determining the real angular position of the reference semi-axis of wheel 46 via electronic means, particularly circuit 58, which receive a measurement signal from sensor 60, particularly at a certain frequency,
- calculating, via these electronic means, for analogue display 41 of timepiece 40, the theoretical angular position of this reference semi-axis as a function of the reference current time given by electronic time base 64,
- driving hour indicator 42 until the real angular position of said reference semi-axis of wheel 46 corresponds to said theoretical angular position.

In a variant, detection of the reference semi-axis of wheel 48 coupled to the minute indicator is also achieved with an accelerated advance of wheel 48. However, since the time necessary to cover an angle of 60 to 90° for the minute hand is 10 to 15 minutes, it is generally possible to detect the angular position of the minute indicator 44 in a normal advance mode. However, in that case, it can no longer be guaranteed that the angular speed is sufficient to prevent any disruption due to a quick temperature variation during measurements for determining the angular position.

Finally, in an alternative implementation of the method of the invention, the timepiece is set into synchronisation mode automatically and periodically, preferably in the second half of the nocturnal period for example at 2 o'clock in the morning.

What is claimed is:

1. A method of synchronising the analogue display of the current time of a timepiece, fitted with a movement having an electronic time base, with said time base, said analogue display including at least one analogue indicator, which is coupled in rotation to a wheel having at least one aperture, said wheel being associated with a proximity sensor arranged for detecting said aperture and for determining the position of a reference semi-axis defined by said aperture, said synchronisation method comprising the following steps:
   - driving said analogue indicator in an accelerated advance mode until said aperture of said wheel passes opposite said proximity sensor;
   - determining the real angular position of said reference semi-axis by electronic means receiving a measurement signal provided by said proximity sensor;
   - calculating, for said analogue display of said timepiece, the theoretical angular position of said reference semi-axis as a function of a reference current time given by said electronic time base; and
   - driving said analogue indicator until the real angular position of said reference semi-axis corresponds to said theoretical angular position.

2. The synchronisation method according to claim 1, wherein said analogue indicator is an hour indicator.

3. The synchronisation method according to claim 2, wherein said timepiece is set into synchronisation mode automatically and periodically in the second half of the nocturnal period.

4. The synchronisation method according to claim 3, wherein said timepiece is set into the synchronisation mode daily or weekly.

5. The synchronisation method according to claim 1, wherein said timepiece is set into synchronisation mode automatically and periodically in the second half of the nocturnal period.

6. The synchronisation method according to claim 5, wherein said timepiece is set into the synchronisation mode daily or weekly.

\* \* \* \* \*